(12) United States Patent
Matarasso (10) Patent No.: US 7,521,111 B2
(45) Date of Patent: Apr. 21, 2009

(54) INFLATABLE CELLULAR CUSHIONING MATERIAL HAVING A BRICK LIKE FORMATION

(75) Inventor: Hasdi Matarasso, Netanya (IL)

(73) Assignee: Green Magic Wrap Packaging Solutions Ltd., Zur Ygal (IL)

( * ) Notice: Subject to any disclaimer, the term of this patent is extended or adjusted under 35 U.S.C. 154(b) by 563 days.

(21) Appl. No.: 10/516,842

(22) PCT Filed: Jun. 4, 2003

(86) PCT No.: PCT/IL03/00478

§ 371 (c)(1),
(2), (4) Date: May 5, 2005

(87) PCT Pub. No.: WO03/104103

PCT Pub. Date: Dec. 18, 2003

(65) Prior Publication Data

US 2005/0221059 A1    Oct. 6, 2005

Related U.S. Application Data

(60) Provisional application No. 60/385,607, filed on Jun. 5, 2002.

(51) Int. Cl.
B32B 1/00 (2006.01)
B65D 81/03 (2006.01)

(52) U.S. Cl. .......................... 428/178; 383/3; 206/522

(58) Field of Classification Search ................ 428/137, 428/166, 178; 383/3; 206/521, 522
See application file for complete search history.

(56) References Cited

U.S. PATENT DOCUMENTS 4,169,002 A    9/1979    Larson
5,340,632 A    8/1994    Chappuis

FOREIGN PATENT DOCUMENTS

FR    87107 E    6/1966
JP    07-165266    *  6/1995

* cited by examiner

*Primary Examiner*—Donald Loney
(74) *Attorney, Agent, or Firm*—Davidson, Davidson & Kappel, LLC (57) ABSTRACT

An inflatable cellular cushioning material (300) having an pipe entry line (314) to be inflated by an inflating device through the use of an air inlet pipe, the inflatable cushioning material comprising at least two layers of plastic welded in such a manner so as to form a substantially horizontally oriented longitudinal lines forming at least one row of cells (320) having at least one opening (336) forming a brick like formation along the horizontal axis of the inflatable cellular cushioning material, such that a flow of air is possible from one cell to another along the horizontal span of the inflatable cellular cushioning material.

19 Claims, 7 Drawing Sheets

INFLATABLE CELLULAR CUSHIONING MATERIAL HAVING A BRICK LIKE FORMATION

PRIORITY APPLICATION

The present application claims priority from U.S. application 60/385,607 for "DEVICE AND METHOD FOR THE PRODUCTION OF CELLULAR CUSHIONED MATERIAL" filed on Jun. 5, 2002.

BACKGROUND OF THE INVENTION

1. Field of the Invention

The present invention relates to a cellular cushioning material, in general and to inflatable cellular cushioning material having horizontal lines creating sleeves material for cushioning products and void filling, in particular.

2. Discussion of the Related Art

Inflatable cellular cushioning materials are widely used for packaging, cushioning of various products, void filling as well as for other uses. Inflatable cellular cushioning materials contain inflated areas, which may be called "bubbles" or "air bubbles", juxtaposed to each other. Hence, an ideal inflatable cellular cushioning material surrounding or wrapping an object can soften a blow from any source external to the object. Typical products that require cushioning are fragile products, such as glass and porcelain, and products that require special care while handling such as electronic apparatuses and the like. Thus, cushioning cellular materials prevent hitting and shocks that may occur to items during their handling in various circumstances such as transportation or elevation. Handling products while unprotected with inflated materials can seriously damage or incline defects to the functionality and esthetic appearance of the products. Naturally, different products with different characteristics regarding to their weight, size, sensitivity to mechanical shocks and the like require different types of inflatable cellular cushioning materials for their protection. Consequently, there are different inflatable cellular cushioning materials used and various types, sizes and shapes of air bubbles.

A key factor that affects the inflatable cellular cushioning materials quality and its production is the feeding material. The feeding material known in the art can have two or more layers and can be a plastic material. One type of feeding material is disclosed in U.S. patent application Ser. No. 09/758,544 now U.S. Pat. No. 6,682,622 titled CELLULAR CUSHIONING MATERIAL AND METHOD FOR ITS PRODUCTION filed on Jan. 12, 2001 by Matarasso ('544). The plastic feeding material disclosed in '544 is a pre-welded plastic material comprised from at least two layers. The pre-welded plastic is welded to have a plurality of diagonally oriented, inflatable sleeves extending substantially the entire width of said sheet, and a longitudinally extending air entry passage. According to '544 each of the inflatable sleeves has an opening for allowing entry of air from said air entry passage into the sleeve. The user inflates the cellular cushioning material using an air injecting pipe located in the center of the sheet inflated, the pipe is inserted into the mid section of the plastic sheet using a knife for cutting a passageway in the middle or side section of the inflatable plastic sheet.

According to '544 each of the sleeves is welded from all sides except for a small opening located in the pipe entry line. Once air is injected into the diagonal sleeves a longitudinal welding is applied to the plastic sheet. The longitudinal welding is applied to the inflated plastic sheet at predetermined intervals. The welding is applied using horizontal bars having heating elements. Each time the bars are applied to the plastic sheet the manufacturing process slows down the production of the cellular cushioning material. Due to the opening between the pre-welded sections, entire areas juxtaposed to the inflated area are not sealed from all of their sides causing the significant reduction in the efficiency of the partially inflated plastic sheet.

A further disadvantage of the feeding pre-welded material shown in '544 refers to the production line size and performance. The configuration of the feeding material providing a plurality of diagonally oriented, inflatable sleeves requires the feeding and inflating area to be considerable larger than actually needed for small quantity of inflatable cellular cushioning material. Thus, all sleeves must be inflated with air prior to be welded in order to exploit and effectively use the feeding material.

Figure 1:
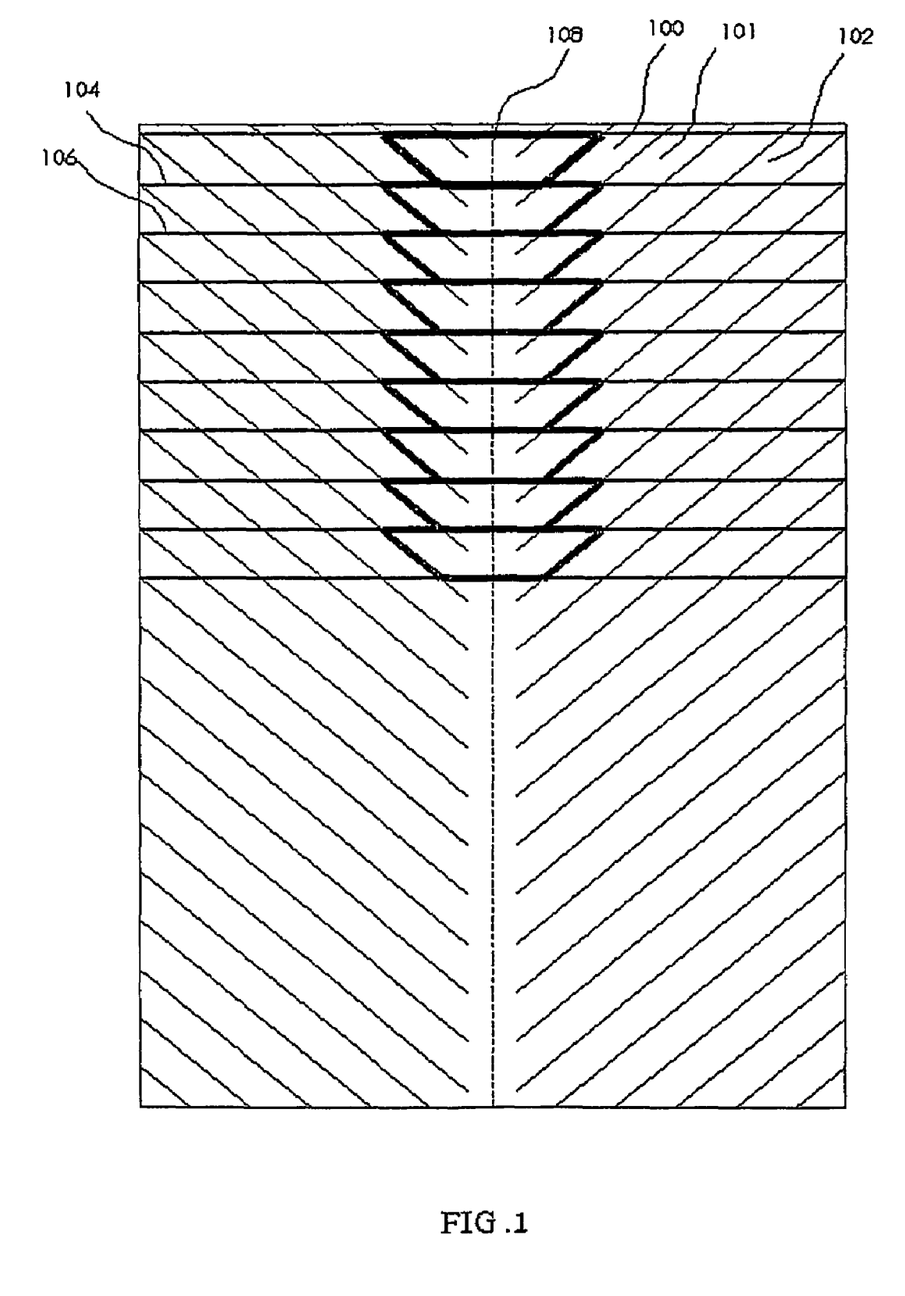
FIG. 1 is a cellular cushioning material having a plurality of diagonally oriented, inflatable sleeves extending substantially the entire width of the shown sheet, known in the art.

Reference is now made to FIG. 1 that shows a plastic sheet having a plurality of diagonally oriented, inflatable sleeves extending substantially the entire width of the shown sheet, known in the art. Once diagonal 100, 101, 102 are air filled, longitudinal weld 104 is made using horizontal welding bars, thus creating non-inflated area 108. Like non-inflated areas are located throughout the length of the air filling section of the plastic sheet. The longer the distance between longitudinal welds 104, 106 the larger the non-inflated sections created within the plastic sheet. The many non-inflated areas reduce the efficiency of the cellular cushioning material and provide a cellular cushioning material which is only partially inflated.

There is therefore a need for a new and novel material which would overcome the disadvantages of the prior art.

SUMMARY OF THE PRESENT INVENTION

In accordance with the above objects, the present invention provides a pre-welded cellular cushioning material.

It is therefore an object of the present invention to provide a pre-welded cellular cushioning material having a minimal non-inflated section.

It is also an object of the present invention to provide an additional horizontal weld during the process of longitudinal welding thus minimizing the non-inflated section during the production of the inflated cellular cushioning material.

Another object of the present invention is to provide a pre-welded cellular cushioning feeding material that enables to reduce the size of an apparatus such as presented in co-filed PCT application titled APPARATUS AND METHOD FOR PRODUCTION OF INFLATED MATERIALS filed on 4 Jun. 2003 which is incorporated herewith to the present invention.

According to one aspect of the present invention there is provided an inflatable cellular cushioning material having an pipe entry line to be inflated by an inflating device through the use of an air inlet pipe, the inflatable cushioning material comprising two or more layers of plastic welded in such a manner so as to form a substantially horizontally oriented longitudinal lines forming one or more rows of cells having one or more opening forming a brick like formation along the horizontal axis of the inflatable cellular cushioning material, such that a flow of air is possible from one cell to another along the horizontal span of the inflatable cellular cushioning material. The cell walls can be rounded. The cells can include three pre-welded cell walls forming an enclosed shape such as straight upright or inverted U straight or rounded like shape or a partial circle. The pipe entry line area is free from longitudinal welds. The pipe entry line area can comprise a perforation line for allowing the air inlet pipe to be inserted between the at least two layers of plastic. The opening in each cell allows gas or air to flow from the air inlet pipe in the general from the air inlet pipe to the extremities of the inflatable cellular cushioning material. The disposition of three side or wall brick like configuration, each such configuration faces the opening of an opposite three side or walls, brick like configuration along the horizontal span of the plastic sheet enables the efficient flow of air from the middle to the exterior sections of the plastic sheet. The material can further comprise a perforated welded line between the rows of cells the perforated welded line allows easy tear of the rows of cells one from the other. The cells can comprise first and second longitudinal pre-welded cell walls separating the cell. Alternatively, every other row of cells is separated by at least one horizontal welded or pre-welded line substantially across the span of the inflatable cellular cushioning material. Each cell can comprise an opening facing an opening in a next row of cells. Each cell can comprise a cell wall (straight or rounded) facing approximately the mid section of a cell in a next row of cells. The length between the first cell wall and the second cell wall adjacent the pipe entry line is preferably smaller than the length between the first cell wall and the second cell remote from the pipe entry line. The horizontal welded line across the span of the inflatable cellular cushioning material is not applied to the pipe entry line area. The longitudinal width of the horizontal weld should be sufficiently long to substantially seal the openings of the cells. The horizontal welded line across the span of the inflatable cellular cushioning material can be applied such that substantially all of the openings of the cells along the rows adjacent to the horizontal weld are sealed. The horizontal pre-welded line can comprise openings facing each cell across the span of the inflatable cellular cushioning material. A line of holes can be positioned on the edges of the inflatable cellular cushioning material. The line of holes can be positioned from each side of the pipe entry line.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

A cellular cushioning material having a plurality of horizontal oriented, inflatable sleeves having horizontal and longitudinal welds in a brick like formation is disclosed.

The present invention overcomes the disadvantages of the prior art by providing cellular cushioning material having horizontal oriented inflatable rows of sleeves with a longitudinal welds, either pre-welded or welded during the process of manufacture, forming brick like formation of sleeves, such that each brick like form is open so to allow the flow of air from an air inlet pipe throughout the length of the sleeve. Thus, the present invention improves the cellular cushioning material substantially reducing the non-inflatable areas and providing the possibility of reducing the size of apparatus to manufacture inflated cellular cushioning material.

Figure 2:
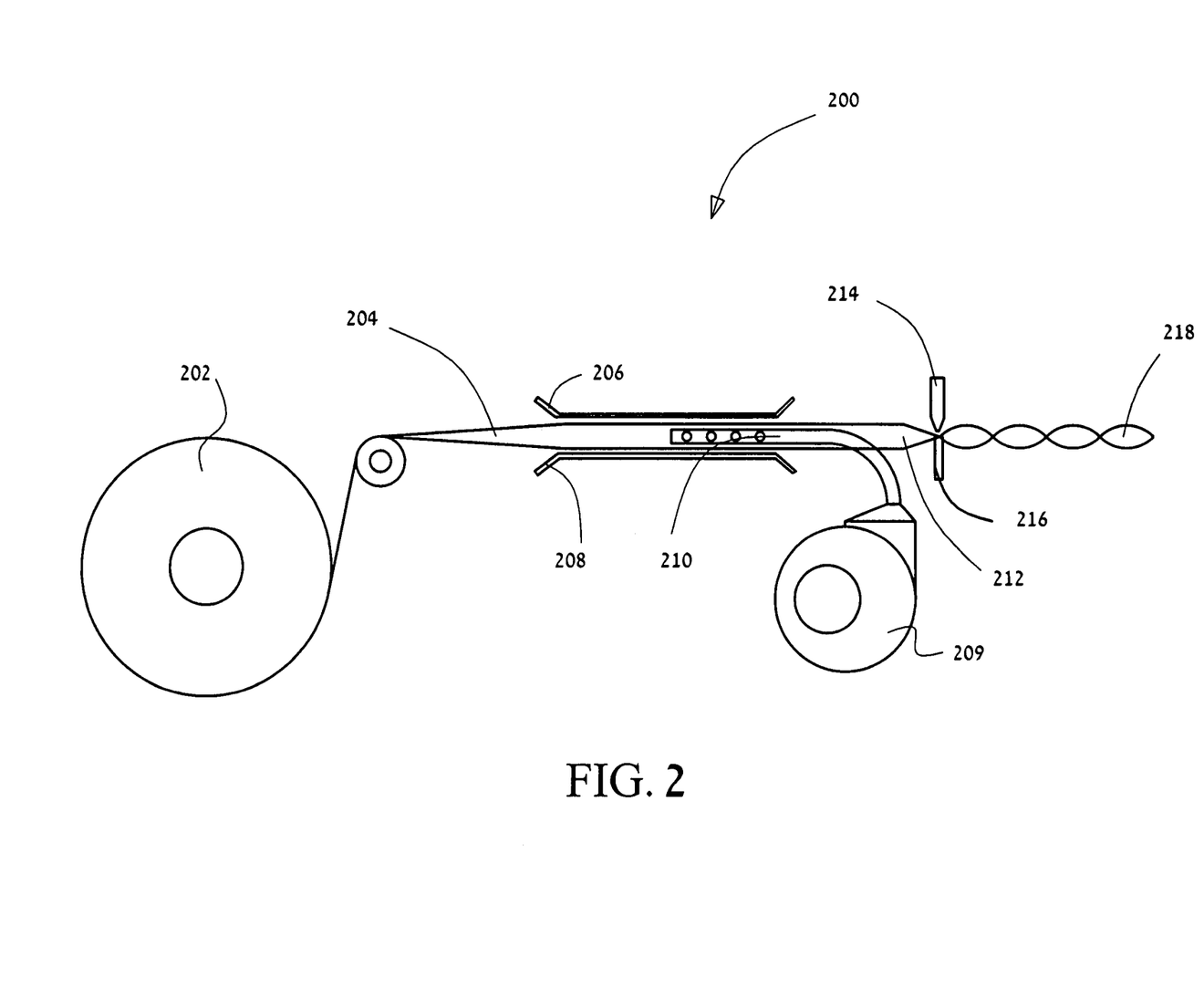
FIG. 2 is a view of an apparatus for manufacturing of the cellular cushioning material, in accordance with the present invention.

The apparatus for manufacturing of the cellular cushioning material in accordance with the present invention is shown in FIG. 2. Apparatus 200 can be used for manufacturing of the cellular cushioning material in accordance with the present invention. Apparatus 200 can be a portable device through which plastic sheet is fed to create the cellular cushioning material. Pre-welded dispensing roll 202 feeds continuous pre-welded plastic sheet 204 through flat plates 206, 208. The pre-welded plastic sheet comprises two or more layers. Preferably each one of the two layers plastic sheet is a bi-layer plastic sheet, thus forming a four layer plastic sheet. In the preferred embodiment, the outer two layers of the plastic sheet are made of thick plastic film which will not be melt during the welding process and the inner two layers are made of thinner plastic sheets which would weld together upon the application of heat and the welding bars. Air inlet pipe 210 is connected via an air conduit to air blower 209 or other air or gas supplying device. Air inlet pipe 210 is inserted via a knife (not shown) or other tearing device between the top and the bottom inner layers of the plastic sheet. Air is injected through the air inlet pipe into the plastic sheet thus inflating the horizontal pre-welded sleeves. The plastic sheet now inflated 212 is welded horizontally using a horizontal bars 214, 216 applying pressure and heat to the inflated plastic sheet, thus providing a welded and inflated cellular cushioning material 218. Other embodiments of apparatuses that can be used are apparatuses depicted in co-filed PCT application for APPARATUS AND METHOD FOR PRODUCTION OF INFLATED MATERIALS.

Figure 3A:
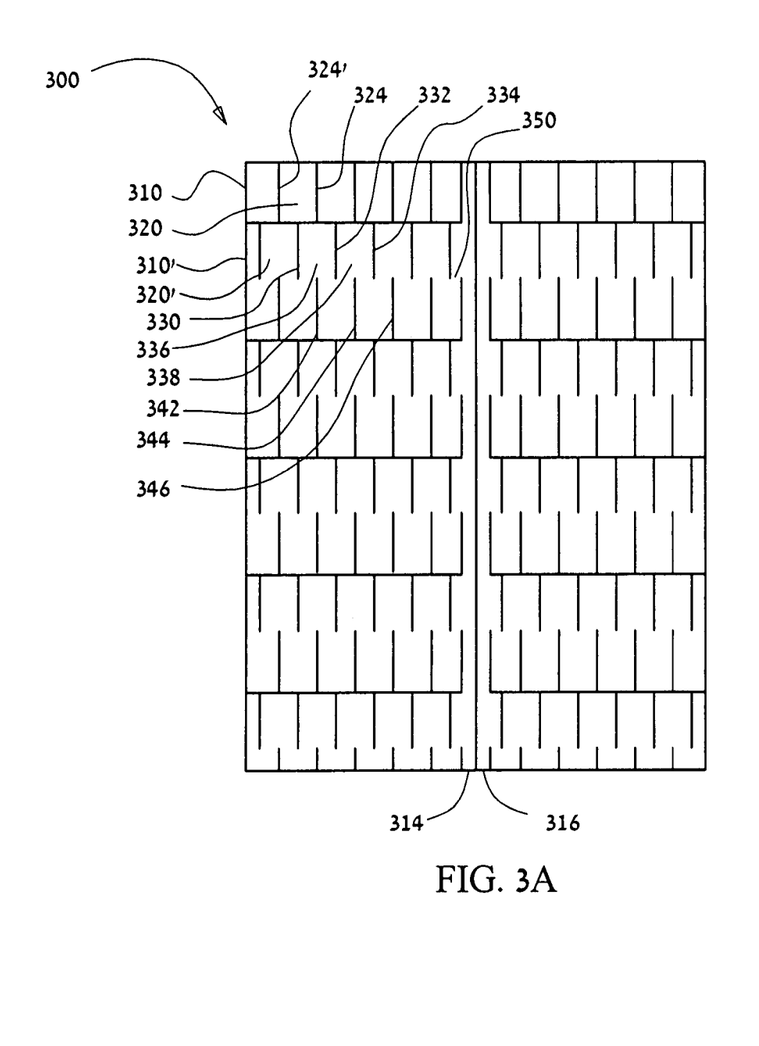
FIGS. 3A and 3B illustrate a cellular cushioning material before and after welding, in accordance with a first and second preferred embodiments of the present invention.
Figure 3B:
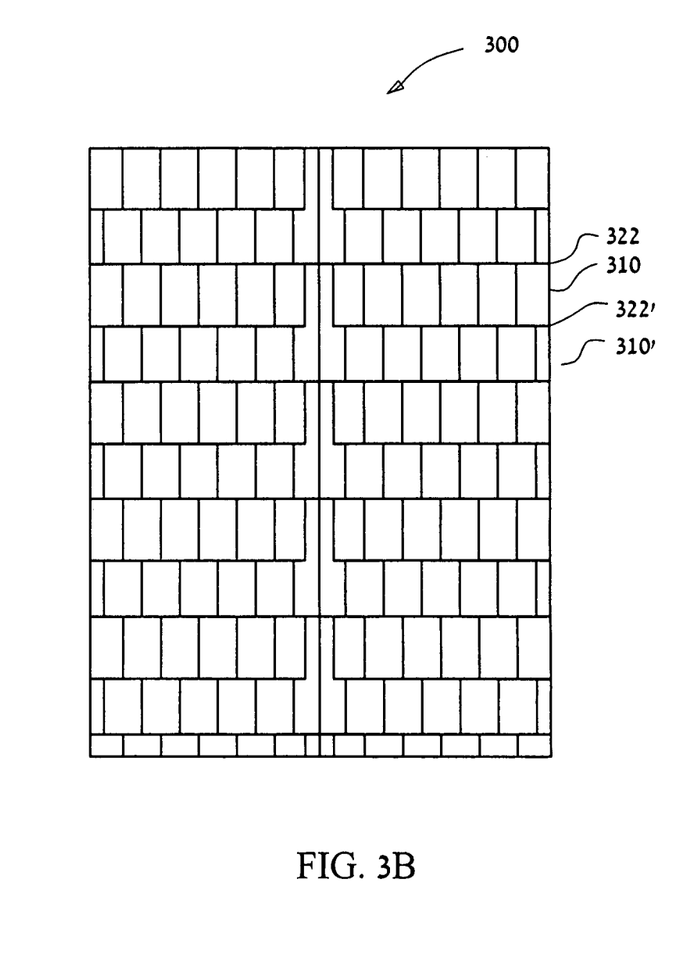

FIGS. 3A, 3B illustrates the first and second preferred embodiments of a cellular cushioning material 300, according to the present invention. FIGS. 3A and 3B introduce cellular cushioning material 300 before and after the welding step as depicted in view of FIG. 2, respectively. FIG. 3A shows horizontal pre-welded rows of sleeves 310, 310' and the like. Rows of sleeves 310, 310' are welded in a brick like or brickwork manner that forms cells 320, 320' within sleeves 310, 310'. Each cell 320, 320' comprises of three pre-welded sides or walls forming a straight upright or inverted U like shape. Longitudinal pre-welded walls 324, 324' separate cell 320. The length of the walls 324 is fixed along the horizontal span of the plastic sheet forming the rows of sleeves 310, 310'. Longitudinal walls can be about 1 centimeter to about 30 centimeters in length. Walls 330, 332, 334 are formed such that a row of cells 336, 338 are formed. Opposite walls 330, 332, 334, creating the three side or wall brick like configuration providing cells 336, 338, an opposite three side or walls brick like configuration is also formed through the welding of walls 342, 344, 346. Walls 342, 344, 346 are located substantially mid way between walls 330, 332, 334 such that walls 342, 344, 346 face the opening of cells 336, 338. According to this embodiment the longitudinal walls of each cell face the opening of an opposite cell such that the flow of air can take place from one cell to the next along the horizontal span of the plastic sheet. So for example, if cell 336 is about 5 centimeters wide than wall 342 would be placed about 2.5 centimeters from walls 330 or 332 and extending outwardly from cell 336. Like configuration is repeated along the horizontal and longitudinal span of the plastic sheet. In an alternative embodiment the distance between the walls adjacent to pipe entry line 314 can be shorter than thus creating a smaller opening 350. While the present embodiment depicts straight longitudinal walls, it will be appreciated that the present invention claims rounded wall as an alternative embodiment. In accordance with this alternative embodiment the walls making the rows of cells are rounded creating a rounded brick like form. Like shaped walls having the same openings are also contemplated by the present invention, such as cells having triangular shape or multi-sides or ribs.

According to this preferred embodiment every two rows of pre-welded brickwork sleeves 310, 310' are separated by a horizontal welded line 340 across the span of the plastic sheet but apart from the area pipe entry line 314, where the air inlet pipe passes. The horizontal line 340 in addition to the side walls 324, 324' create the three side or walls comprising the brick like formation along the horizontal and longitudinal span of the plastic sheet. No welded lines are created along the middle or side (not shown) section where the pipe entry line 314, thus, enabling inflated air insertion by air inlet pipe to the plastic sheet and the creation of the cellular cushioning material. The welded walls are created through the process of welding of two or more layers of plastic along the predefined lines making the material disclosed by the present invention. As note above, the cellular cushioning material as shown in FIG. 3A includes a pipe entry line 314 and a perforated line 316 that enables the easy separation of the ready to use cellular cushioning material. During the process of manufacture the plastic sheet is fed through flat plates 206, 208 of FIG. 2. Air inlet pipe 210 inflates the plastic sheet sleeves 310, 310' and when the sleeves 310, 310' inflated at location 212, horizontal plastic sealing bars 214, 216 weld the plastic sheet along 322, 322' and so forth. Cellular cushioning material as shown in FIG. 3B includes welding lines 322, 322' that create closed inflated areas between each pre-welded brickwork sleeves 310, 310' and the like. Welding lines 322, 322' executed by horizontal welding bars as depicted in view of FIG. 2 above must be applied at the correct time in order for the cellular cushioning material to be completely sealed. To avoid the problem wherein the horizontal welds 322, 322' is misplaced, horizontal bars having a wider weld area maybe used. In addition, accurate aligning of the plastic sheet prior to welding is important to enable the appropriate manufacturing of the cellular cushioning material shown in FIG. 3B.

Figure 6:
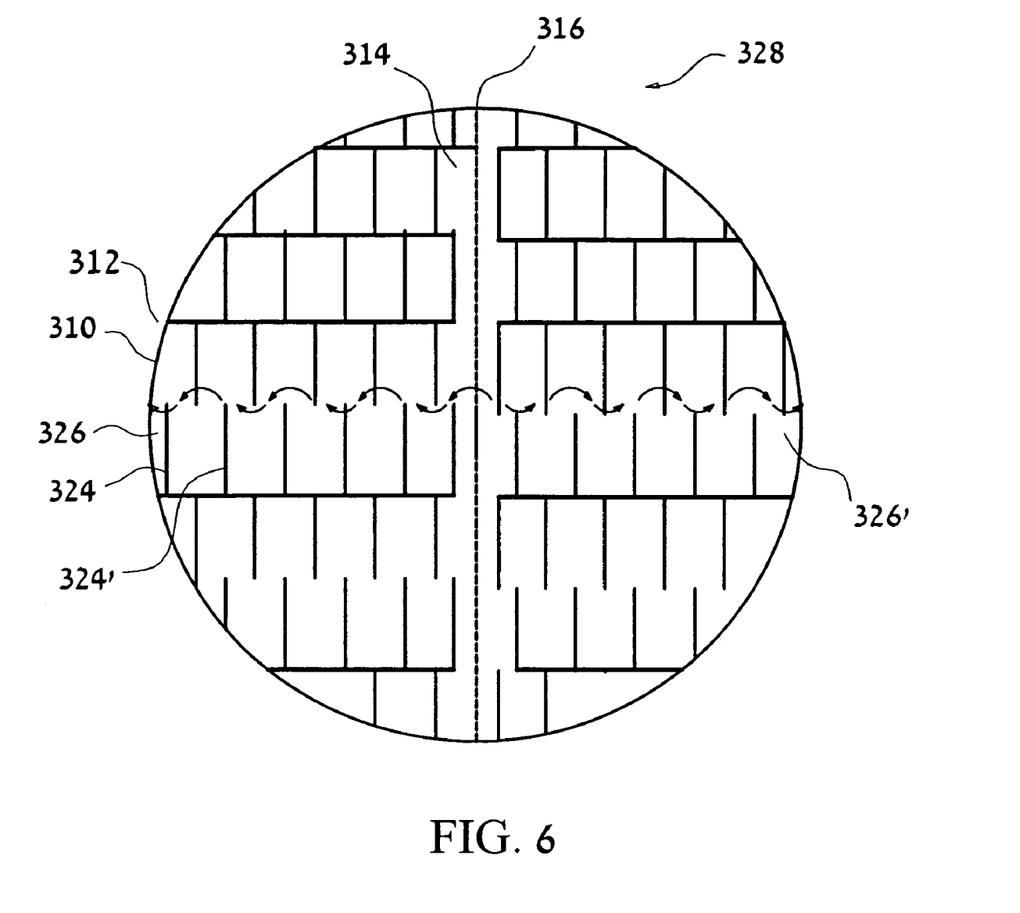
FIG. 6 is a schematic illustration of the inflating air streamline in accordance with a preferred embodiment of the present invention.

The inflation of air or gas within pre-welded brickwork sleeves 310 is shown in detail in FIG. 6. According to the preferred embodiment of the present invention air inflation to pre-welded brickwork sleeves 310 and the like is performed from pipe entry line 314. Accordingly, the inflated air streams from air inlet pipe (not shown) in the general direction according to the arrow lines 326, 326' to both side of pipe entry line 314. The disposition of three side or wall brick like configuration, each such configuration faces the middle opening of an opposite three side or walls brick like configuration along the horizontal span of the plastic sheet enables the efficient flow of air from the middle to the exterior sections of the plastic sheet. The air stream flows from the middle section of the pre-welded cellular cushioning material 328 towards the outer sections in the direction of arrows 326, 326' such that the sleeves from right and left of the inlet pipe are filled with air. Because the pre-welded cellular cushioning material advances along flat plates 206, 208 of FIG. 2 in a pace dependent upon the providing of the longitudinal welds, sufficient air can be blown into sleeves 310 throughout the period of time the pre-weld cellular cushioning material advances within the plates such that the sleeves are sufficiently inflated by the time the horizontal weld is applied by the horizontal bars 214, 216 of FIG. 2. After the inflated air quantity within the pre-welded cellular cushioning material 328 is sufficient the welding of horizontal welding bars can be performed as shown in FIG. 3B above. The rows forming the sleeves as depicted above enable to reduce the size of a device to produce cellular cushioning material. As opposed to filling air in diagonally oriented sleeves, the filling of air into horizontal sleeves is preferable because the inflated area is smaller. Thus, the inflated area before performance of the welding step as depicted in view of FIG. 2 above can be reduced to the inflated area of a single pre-welded brickwork sleeve 310. The size reduction of the device for production of cellular cushioning material enables to supply compact apparatuses for small consumers that require a limited amount of cellular cushioning material for their own use and for filling on the spot in real-time. The cellular cushioning material according to the various preferred embodiments of the present invention complies with quality of cellular cushioning material of all types of cellular cushioning material and concurrently enables to reduce the apparatus used for its manufacturing.

Figure 4A:
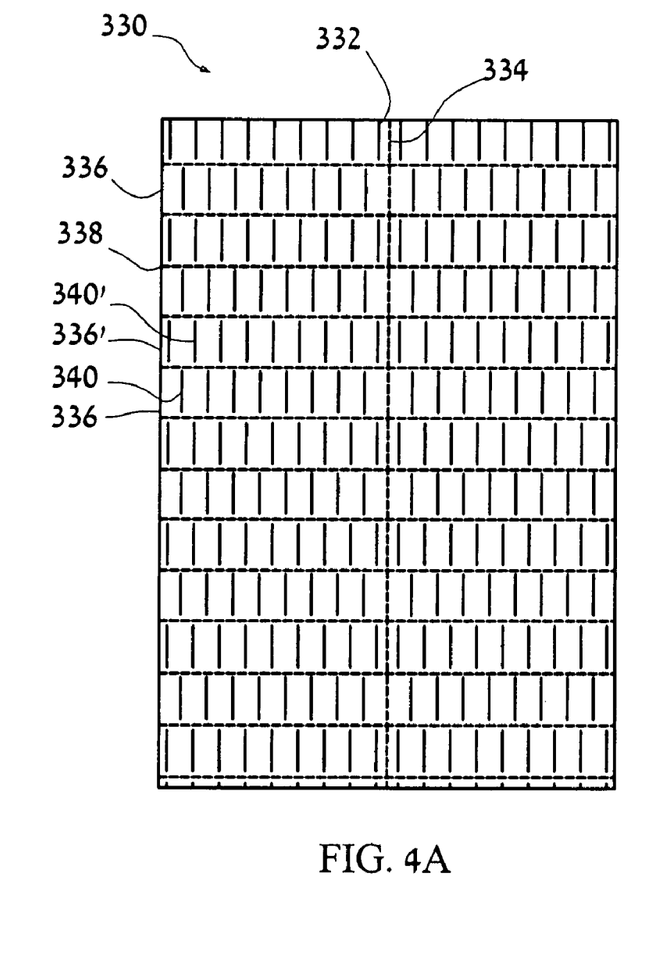
FIGS. 4A, 4B and 4C illustration a cellular cushioning material before and after welding, in accordance with a third and fourth preferred embodiments of the present invention.
Figures 4B, 4C:
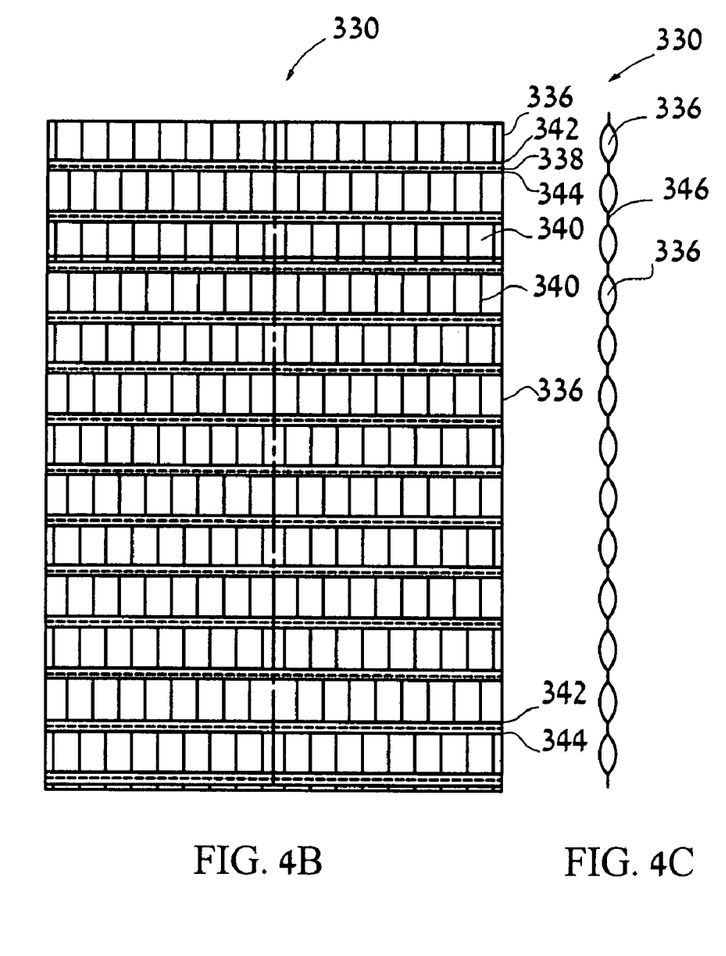

FIGS. 4A, 4B and 4C illustrate a third and a fourth embodiments of the present invention. FIG. 4A shows a pre-welded cellular cushioning material 330 in the initial stage, FIG. 4B shows a front view of welded cellular cushioning material 330 and FIG. 4C shows a side view of the welded cellular cushioning material 330 shown in FIG. 4B. Pre-welded cellular cushioning material 330 shown in FIG. 3A is constructed from brickwork sleeves 336. Brickwork sleeves 336 are divided to separates cells 338 by welded "walls". Each brickwork sleeve 336 is separated from another by a perforated welded line 338. Perforated line 338 enables an easy division of the ready to use cellular cushioning material 330 as shown in FIGS. 4B and 4C. Cellular cushioning material 330 according to the present embodiment has a pipe entry line 332. Though pipe entry line 332 is positioned in the center of cellular cushioning material 330 according to other embodiments it can be positioned on the side of the plastic sheet or other position. Pipe entry line 332 includes according to the present embodiment a perforated line 334 that enables an easy division of cellular cushioning material 330 if required by the consumer. After air inflation to cellular cushioning material 330 is performed by air inlet pipe (not shown) the sealing of the brickwork sleeve 336 is performed as shown in FIG. 4B. Welded longitudinal walls 340 are placed in predetermined distance one from the other. In alternate lines such as line 336' longitudinal walls 340' are located between and forward lines 340, 341, thus forming the brick like formation. Perforation lines 338 are welded such that air may flow between perforation line 338 and longitudinal wall lines 340. As shown in FIG. 6 inflated air may flow from the middle section 332 towards the exterior ends of plastic sheet inflating the horizontal sleeved rows 336. Once air filled sleeves 336 reach horizontal bars 214, 216 which will now be applied to the plastic sheet and form the cellular cushioning material shown in FIG. 4B. According to this preferred embodiment horizontal welding bars weld two parallel welded lines 342 and 344 from both side of perforated line 338. Thus, parallel welded lines 342 and 344 seal inflated brickwork sleeves 336 and still provide an easy possibility of division of the cellular cushioning material 330 horizontally. By having a perforated line on each line 338 along the longitudinal axis of the plastic sheet, each row 336 may be individually easily separated and used by the consumer. The inflated cells 340 are sealed by the side walls 340 from the pre-welded cellular cushioning material 330 and by parallel welded lines 342 and 344. FIG. 4C shows a side view of cellular cushioning material 330 of FIG. 4B. Accordingly, inflated brickwork sleeves 336 are shown presenting only a single inflated cell. According to the preferred embodiment flat un-inflated areas 346 separate brickwork sleeves 336. The flat un-inflated areas 346 are the result of the parallel welded lines 342 and 344 as well as the perforated horizontal line 338.

Figure 5A:
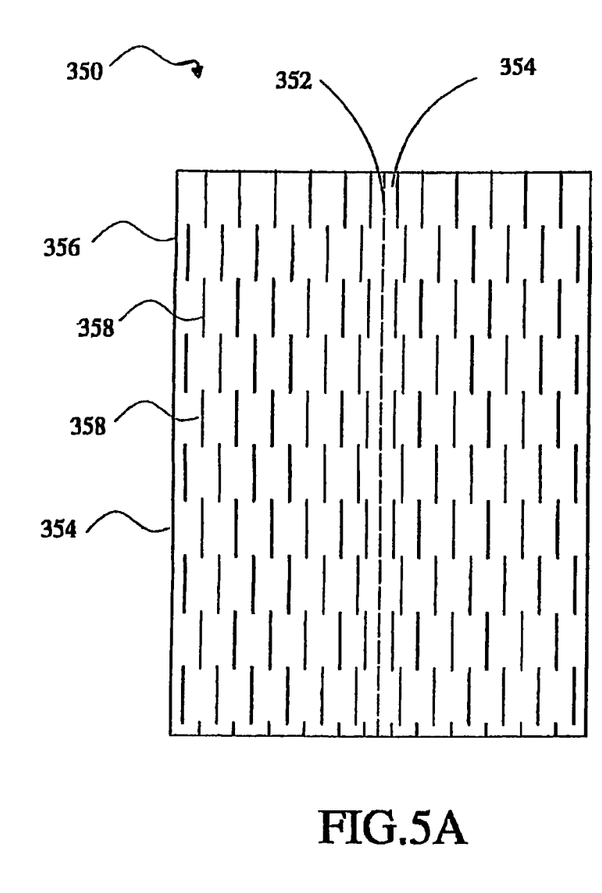
FIGS. 5A, 5B and 5C illustration a cellular cushioning material before and after welding, in accordance with a fifth and sixth preferred embodiments of the present invention.
Figures 5B, 5C:
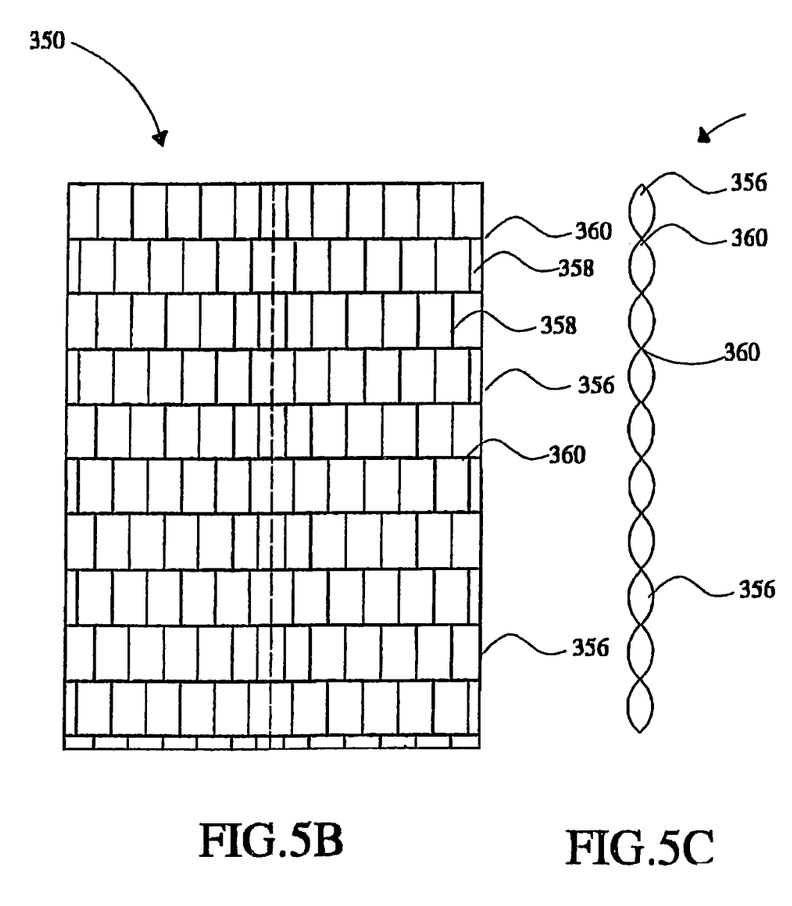

FIGS. 5A, 5B and 5C show a fourth and fifth embodiments of the present invention. Cellular cushioning material 350 has resemblance to the embodiment shown in FIGS. 4A, 4B and 4C. Cellular cushioning material 350 comprises rows of short longitudinal lines such as line 358. The pre-welded rows of longitudinal lines of 356 comprise pre-welded longitudinal lines 358 that provide the brickwork resemblance structure to cellular cushioning material 350 without having horizontal lines. The positioning of longitudinal lines in this embodiment is similar to that shown in FIGS. 3A and 4A such that in alternate rows longitudinal lines are pre-welded in the forward and middle position in respect of pre-welded longitudinal lines in the previous row. Cellular cushioning material 350 includes a pipe line entry line 354 and a longitudinal perforated line 352. The air inlet pipe inflates air to cellular cushioning material 350 and once sufficient air is inserted the welding step is performed. FIG. 5B shows cellular cushioning material 350 front view after welding by horizontal bars 214, 216 according to the welding step depicted in FIG. 2 above. Horizontal welding lines 360 seal the inflated area of pre-welded rows 356 forming an inflated brickwork resembling sleeves. A side view of cellular cushioning material 350 is shown in FIG. 5C. Accordingly, the brickwork sleeves 356 are viewed as single inflated cell. The cellular cushioning material 350 side view shows the sealing welding line 360 between brickwork sleeves 356.

Figure 7:
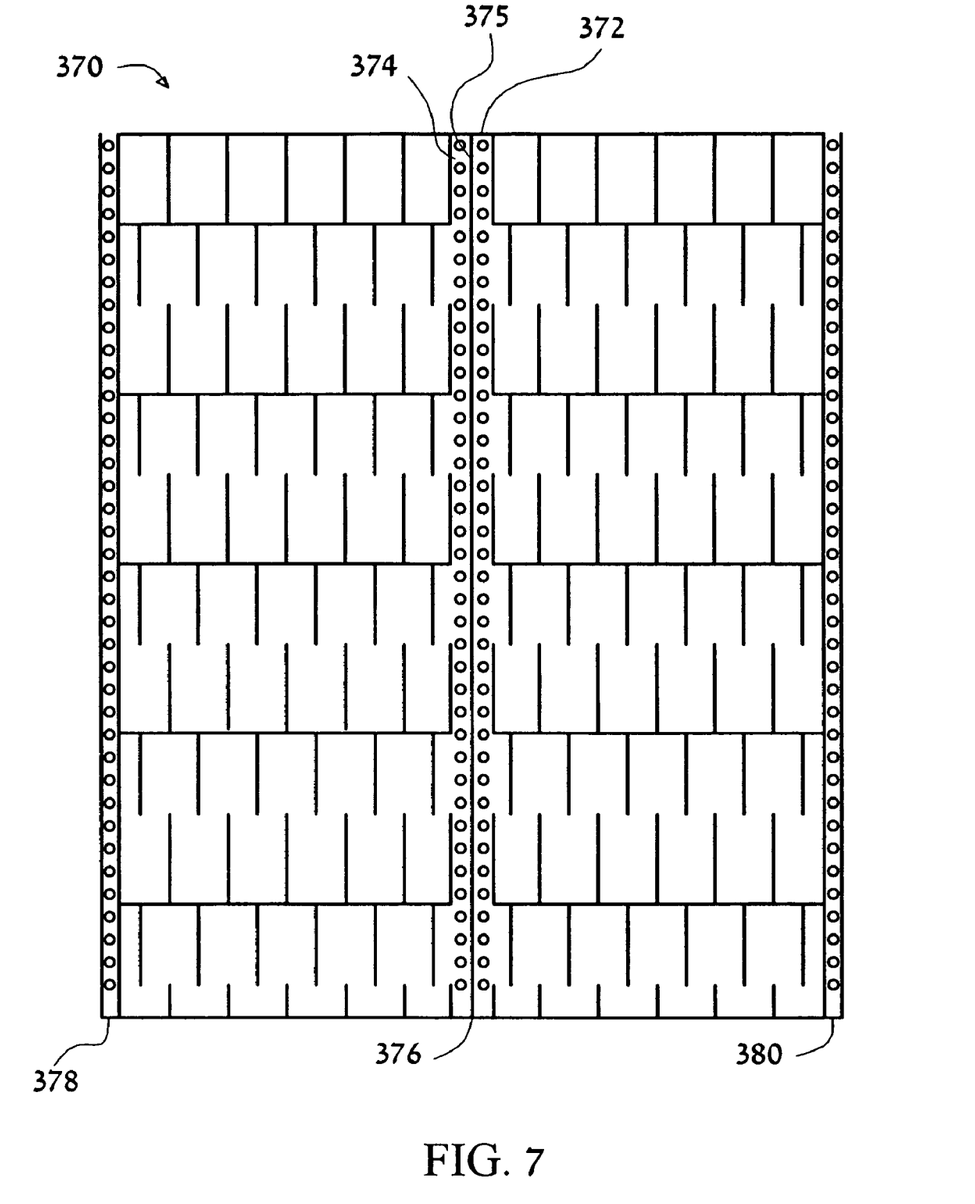
FIG. 7 illustrates a cellular cushioning material before welding, in accordance with a seventh preferred embodiment of the present invention.

FIG. 7 shows a seventh embodiment according to the present invention. Pre-welded cellular cushioning material 370 shows an embodiment that has a close resemblance to the embodiment depicted in view of FIGS. 3A and 3B. The cellular cushioning material 370 is differentiated from embodiment 300 in FIGS. 3A and 3B by the two additional additions: two longitudinal lines of holes 372 and 374 positioned along the pipe entry line 376 and on opposite sides of perforated line 375. In addition longitudinal lines of holes 378 and 380 positioned on the side edges of cellular cushioning material 370 may also be added. Longitudinal lines of holes 372 and 374 as well as lines 378, 380 enable an easy advance of the cellular cushioning material 370. One method contemplated by the co-filed related PCT patent application titled APPARATUS AND METHOD FOR PRODUCTION OF INFLATED MATERIALS incorporated by reference to this application, comprises an apparatus with correlating protrusion wheel or conveyor having spokes or protrusions such that the protrusions fit the lines of holes shown in FIG. 7 so as to assist in the advancement of the plastic sheet along the manufacturing line of the apparatus 200 and to adjust and control the sufficient amount of inflated air within cellular cushioning material 370.

Persons skilled in the art that the present invention is not limited to what has been particularly shown and described hereinabove will appreciate it. Rather the scope of the present invention is defined only by the claims that follow.

The invention claimed is:

1. An inflatable cellular cushioning material having a pipe entry line to be inflated by an inflating device through the use of an air inlet pipe, the inflatable cushioning material comprising at least two layers of plastic pre-welded to each other so as to form horizontal rows of longitudinal pre-welded lines defining longitudinal walls of cells in a brick-like configuration such that longitudinal walls in one row are offset with respect to longitudinal walls in adjacent rows, wherein each of said horizontal rows opens into said pipe entry line and wherein each cell in a row of cells opens to at least one cell in at least one adjacent row of cells such that a flow of air is possible from one cell to another along the horizontal span of the inflatable cellular cushioning material.

2. The material of claim 1 wherein said longitudinal pre-welded lines are curved.

3. The material of claim 1 wherein the at least two layers of plastic are further pre-welded by at least one horizontal line between two adjacent rows of longitudinal lines.

4. The material of claim 1 wherein the pipe entry line area is free from longitudinal welds.

5. The material of claim 1 wherein the pipe entry line area comprises a perforation line for allowing the air inlet pipe to be inserted between the at least two layers of plastic.

6. The material of claim 1 further comprising a perforated welded line between at least one row of cells and an at least second row of cells, the perforated welded line allows easy tear of the at least one row of cells from the at least second row of cells.

7. The material of claim 1 wherein every other row of cells is separated by at least one horizontal pre-welded line substantially across the span of the inflatable cellular cushioning material.

8. The material of claim 1 further comprising at least one longitudinally extending line of holes for facilitating advancing the material in a machine adapted for forming an inflated cellular cushioning material from said inflatable material.

9. The material of claim 1 wherein the longitudinal walls of a cell in one row are located substantially mid way between the walls in the next row.

10. The material of claim 1 wherein the distance between adjacent longitudinal lines in a row is about 1 to 20 centimeters.

11. The material of claim 10 wherein the distance between adjacent longitudinal lines positioned on opposite sides of the pipe entry line is smaller than the distance between adjacent longitudinal lines positioned on the same side of the pipe entry line.

12. The material of claim 7 wherein the at least one horizontal pre-welded line across the span of the inflatable cellular cushioning material is not applied to the pipe entry line area.

13. The material of claim 1 wherein the cells are sealed after being inflated by applying horizontal welding lines across the span of the inflatable cellular cushioning material at predetermined intervals such as to form rows of individual inflated cells across the width of said material.

14. The material of claim 8 wherein the line of holes is positioned on the edges of the inflatable cellular cushioning material.

15. An inflatable cellular cushioning material comprising a sheet formed from at least two layers of plastic joined to each other at both longitudinal sides and welded to each other in a predetermined pre-welded pattern, said predetermined pre-welded pattern is configured to allow formation of horizontal rows of closed inflated cells by continuously inflating said sheet and applying horizontal sealing lines every predetermined interval along the longitudinal axis of the inflated sheet, wherein:

said predetermined pre-welded pattern comprises parallel horizontal rows of longitudinal lines defining longitudinal walls of cells in a brick-like configuration such that longitudinal walls in one row are offset with respect to longitudinal walls in adjacent rows;

said horizontal rows of longitudinal lines are configured such as to leave a free longitudinally extending air entry passage; and each of said horizontal rows opens into said air entry passage and each cell in a row of cells opens to at least one cell in an at least one adjacent row of cells such that a flow of air is possible from one cell to another along the horizontal span of the inflatable cellular cushioning material.

16. The inflatable cellular cushioning material of claim 15 wherein said horizontal rows of longitudinal lines have a row width in the longitudinal direction of said sheet and wherein the longitudinal lines in a horizontal row extend across the full row width of the row.

17. The inflatable cellular cushioning material of claim 16 wherein the predetermined interval between the applied horizontal sealing lines is substantially equal to said row width or to twice said row width.

18. The inflatable cellular cushioning material of claim 15 wherein said predetermined pre-welded pattern further comprises at least one pre-welded horizontal line extending between two adjacent horizontal rows, said at least one pre-welded horizontal line extending substantially the full width of said material but for an interruption across the air entry passage.

19. The inflatable cellular cushioning material of claim 15 wherein said predetermined pre-welded pattern further comprises pre-welded horizontal lines extending between adjacent horizontal rows after every other row, said pre-welded horizontal lines extending substantially the full width of said material but for an interruption across the air entry passage.

* * * * *